(12) United States Patent
Sherman et al.

(10) Patent No.: US 11,329,518 B2
(45) Date of Patent: May 10, 2022

(54) LONG-RANGE WIRELESS CHARGING

(71) Applicant: POWERMAT TECHNOLOGIES LTD., Petach Tikva (IL)

(72) Inventors: Itay Sherman, Hod Hasharon (IL); Elieser Mach, Rosh Tzurim (IL)

(73) Assignee: POWERMAT TECHNOLOGIES LTD., Petach Tikva (IL)

( * ) Notice: Subject to any disclaimer, the term of this patent is extended or adjusted under 35 U.S.C. 154(b) by 9 days.

(21) Appl. No.: 16/910,499

(22) Filed: Jun. 24, 2020

(65) Prior Publication Data

US 2020/0403453 A1 Dec. 24, 2020

Related U.S. Application Data

(60) Provisional application No. 62/865,345, filed on Jun. 24, 2019.

(51) Int. Cl.
*H02J 50/20* (2016.01)
*H02J 50/40* (2016.01)
*H04B 7/06* (2006.01)
*G06T 7/70* (2017.01)
*H02J 50/60* (2016.01)
*H02J 50/80* (2016.01)
*H02J 7/02* (2016.01)
*G06V 40/10* (2022.01)

(52) U.S. Cl.
CPC ............... *H02J 50/40* (2016.02); *G06T 7/70* (2017.01); *G06V 40/10* (2022.01); *H02J 7/02* (2013.01); *H02J 50/20* (2016.02); *H02J 50/60* (2016.02); *H02J 50/80* (2016.02); *H04B 7/0617* (2013.01); *G06T 2207/30196* (2013.01)

(58) Field of Classification Search
CPC ...................................................... H02J 50/60
USPC ................................................... 320/108
See application file for complete search history.

(56) References Cited

U.S. PATENT DOCUMENTS

| 2010/0117596 | A1* | 5/2010 | Cook ............... | H02J 50/12 |
| | | | | 320/108 |
| 2012/0153731 | A9* | 6/2012 | Kirby .............. | H04B 5/02 |
| | | | | 307/104 |
| 2014/0128032 | A1* | 5/2014 | Muthukumar ...... | H04W 4/12 |
| | | | | 455/411 |
| 2019/0036383 | A1* | 1/2019 | Wang .............. | H02J 50/60 |

* cited by examiner

*Primary Examiner* — Edward Tso
*Assistant Examiner* — Ahmed H Omar
(74) *Attorney, Agent, or Firm* — Volpe Koenig

(57) ABSTRACT

According to a first aspect of a long-distance wireless charging system for charging at least one receiver in a venue that is used by humans or animals, the long-distance wireless charging system comprises a plurality of antennas aligned for transmitting RF radiation to a space within the venue; at least one sensor for determining a position of at least one animal and a location of the at least one receiver in the space; and a transmitter, having a controller, configured to shape the RF radiation to peak the RF radiation on the location of the at least one receiver and null the RF radiation around the position of the at least one animal by controlling amplitudes and phases of the RF radiation transmitted from each antenna of the plurality of antennas.

20 Claims, 3 Drawing Sheets

LONG-RANGE WIRELESS CHARGING

CROSS-REFERENCE TO RELATED APPLICATION

This application claims priority under 35 U.S.C. § 119(e) from U.S. Provisional Patent Application Ser. No. 62/865,345, filed Jun. 29, 2019, by Itay Sherman, titled "Long Distance Wireless Charging", incorporated herein by reference for all purposes.

TECHNICAL FIELD

The present disclosed subject matter relates to wireless power charging systems. More particularly, the present disclosed subject matter relates to a long-range wireless charging transmitter, system, and a method thereof.

BACKGROUND

Growing demand for wireless power charging systems led to dramatic deployments increase, in a wide variety of venues, and raise the need for increasing the effective charging distance between a transmitter and a receiver. Inductive charging or resonance-based charging provides solutions for charging of devices with wide range of power demands, but with limited transmitter to receiver distance.

RF-based wireless charging systems that are able to deliver power to larger distances have been proposed, however, they cannot comply with safety regulation limitation for a field strength to which a person can be exposed. These regulations bring about a strict limitation on the amount of RF energy that a transmitter has to emit in order to provide sufficient energy for long-range charging.

BRIEF SUMMARY OF THE INVENTION

According to a first aspect of the present disclosed subject matter, long-distance wireless charging system for charging at least one receiver in a venue that is used by humans or animals, the long-distance wireless charging system comprising: a plurality of antennas aligned for transmitting RF radiation to a space within the venue; at least one sensor for determining a position of at least one animal and a location of the at least one receiver in the space; and a transmitter, having a controller, configured to shape the RF radiation to peak the RF radiation on the location of the at least one receiver and null the RF radiation around the position of the at least one animal by controlling amplitudes and phases of the RF radiation transmitted from each antenna of the plurality of antennas.

In some exemplary embodiments, the plurality of antennas are bidirectional antennas, and wherein the location of the at least one receiver is determine based on signals initiated by the at least one receiver and received by at least one antenna of the plurality of antennas.

In some exemplary embodiments, the controller obtains images from the at least one sensor for forming a three-dimensional map of the venue, and wherein the controller comprising an image-analysis-algorithm configured for determining the position of the at least one animal and the location of the at least one receiver in the space.

In some exemplary embodiments, the at least one sensor is selected from a group consisting of a three-dimensional (3D) camera; at least two two-dimensional cameras, at least two two-dimensional thermal cameras at least one laser range finder, a plurality of proximity sensors; and any combination thereof, or the like.

In some exemplary embodiments, the transmitter further comprises a frequency oscillator; a plurality of phase shifters; and a plurality of programable gain amplifiers used, by the controller, to shape the RF radiation to each antenna by selectively controlling frequencies, amplitudes, and phases of RF radiation transmitting of each antenna of the plurality of antennas.

In some exemplary embodiments, the transmitter further comprises a plurality of splitters and a phase comparator, wherein the signals received by a bidirectional antenna of the bidirectional antennas are directed via a splitter of the plurality of splitter to the phase comparator, and wherein the phase comparator is used by the controller for determining the location of the at least one receiver.

In some exemplary embodiments, the transmitter further comprises a communication interface used by the controller for communicating with the at least one receiver, and wherein the communication interface is selected from a group consisting of Bluetooth Low Energy, Bluetooth, Wi-Fi, infrared communication; and any combination thereof, or the like.

In some exemplary embodiments, the long-distance wireless charging system further comprises test objects placed in the venue during a system calibration procedure.

According to a another aspect of the present disclosed subject matter, an operating method of a long-range wireless charging system for charging at least one receiver in a venue that is used by humans or animals, the method comprising: initializing the system, wherein the system comprising a transmitter, having a controller, used to control a plurality of antennas for transmitting RF radiation, by each antenna, to a space within the venue; and at least one sensor connected to the transmitter; determining location and status of the at least one receiver based on signals initiated by the at least one receiver and received by the at least one antenna of the plurality of antennas; determining presence and position of at least one animal in the space by the at least one sensor; shaping, by the controller, the RF radiation for forming at least one RF radiation transmitting pattern to peak on the location of the at least one receiver and null around the position of the at least one animal by characterizing amplitudes and phases of the RF radiation to be emitted by each antenna of the plurality of antennas; transmitting the RF radiation transmitting pattern by the plurality of antennas.

In some exemplary embodiments, the initializing of the system comprises: determining a 3D map and coordinates of the venue; and determining coordinates of the space that the plurality of antennas cover.

In some exemplary embodiments, the initializing further comprises: conducting a calibration procedure comprising aligning the coordinates of the venue with the coordinates of the space; performing emission measurements for each antenna of the plurality of antennas; and preset the measurements to the controller as normalizing factor for each antenna of the plurality of the antennas.

In some exemplary embodiments, the initializing the system further comprises using the 3D map and coordinates for determining location of objects and their RF reflection index in the venue to be used in the shaping for mitigating reflection effects.

In some exemplary embodiments, the determining location and status further comprises analyzing, by the controller, phase and timing differences between signals received by the at least one antenna.

In some exemplary embodiments, the determining location and status of the at least one receiver is determined by the controller using images obtained by the at least one sensor and an image-analysis-algorithm.

In some exemplary embodiments, the status comprising indications selected from a group consisting of absent; remain; and moved, and wherein transmitting the RF radiation pattern is ceased by the controller following absent indication.

In some exemplary embodiments, the determining presence and position of at least one animal comprises using the controller for obtaining images from the at least one sensor and utilizing an image-analysis-algorithm.

In some exemplary embodiments, the shaping is based on calculating an error term.

In some exemplary embodiments, the shaping further comprises calculating one or more frequencies of RF radiation to be emitted by each antenna of the plurality of antennas.

In some exemplary embodiments, RF radiation transmitting patterns have different characterizing.

In some exemplary embodiments, the transmitter uses time sharing sequence for separately transmitting RF radiation transmitting pattern to each receiver of the at least one receiver.

BRIEF DESCRIPTION OF THE DRAWINGS

Some embodiments of the disclosed subject matter described, by way of example only, with reference to the accompanying drawings. With specific reference now to the drawings in detail, it is stressed that the particulars shown are by way of example and for purposes of illustrative discussion of the preferred embodiments of the present disclosed subject matter only, and are presented in the cause of providing what is believed to be the most useful and readily understood description of the principles and conceptual aspects of the disclosed subject matter. In this regard, no attempt is made to show structural details of the disclosed subject matter in more detail than is necessary for a fundamental understanding of the disclosed subject matter, the description taken with the drawings making apparent to those skilled in the art how the several forms of the disclosed subject matter may be embodied in practice.

In the drawings.

DETAILED DESCRIPTION OF THE INVENTION

Figure 1:
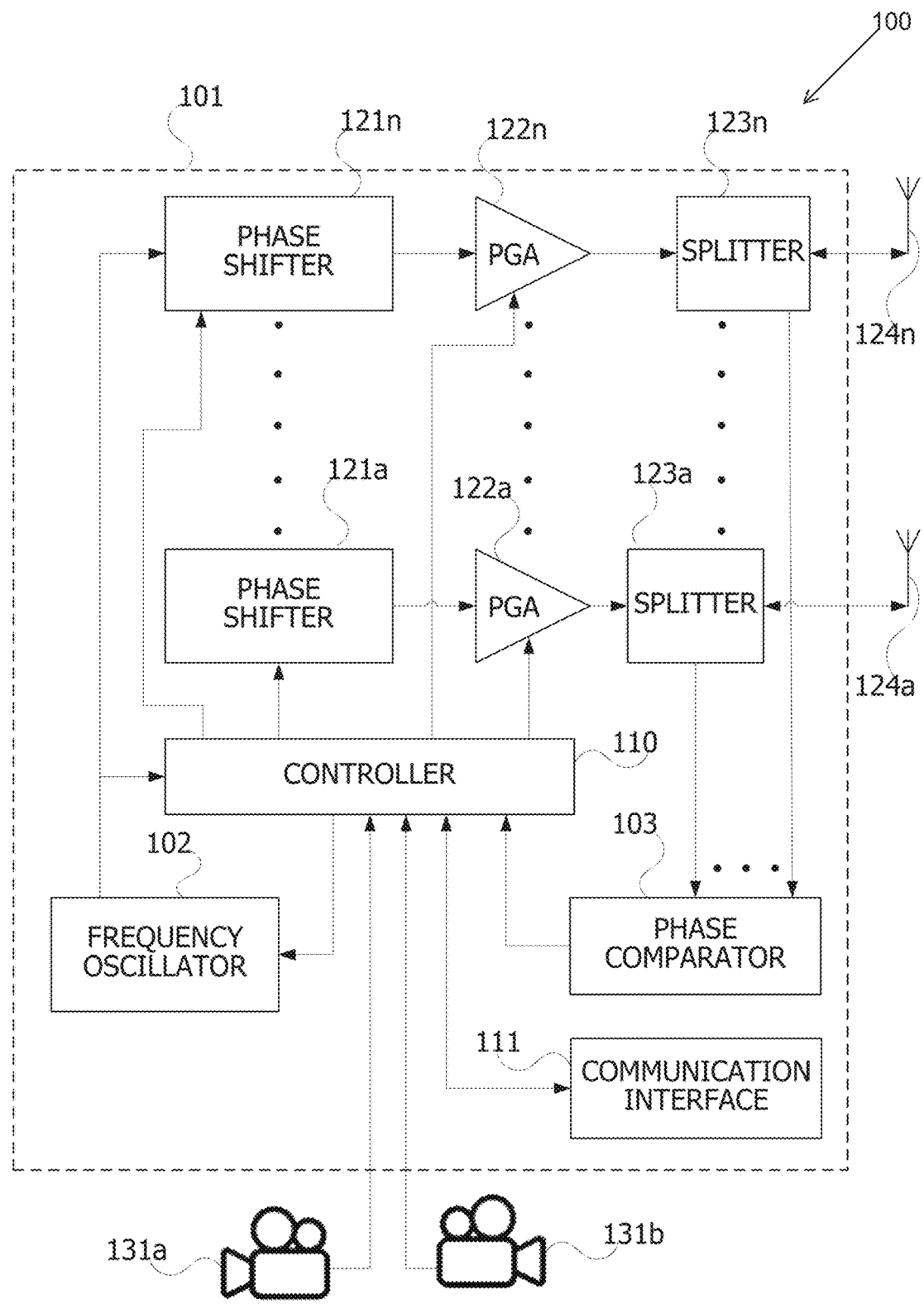
FIG. 1 shows a block diagram of a long-range wireless charging system, in accordance with some exemplary embodiments of the disclosed subject matter.

Before explaining at least one embodiment of the disclosed subject matter in detail, it is to be understood that the disclosed subject matter is not limited in its application to the details of construction and the arrangement of the components set forth in the following description or illustrated in the drawings. The disclosed subject matter is capable of other embodiments or of being practiced or carried out in various ways. Also, it is to be understood that the phraseology and terminology employed herein is for the purpose of description and should not be regarded as limiting. The drawings are generally not to scale. For clarity, non-essential elements were omitted from some of the drawings.

The terms "comprises", "comprising", "includes", "including", and "having" together with their conjugates mean "including but not limited to". The term "consisting of" has the same meaning as "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this disclosed subject matter may be presented in a range format. It should be understood that the description in range format is merely for convenience and brevity and should not be construed as an inflexible limitation on the scope of the disclosed subject matter. Accordingly, the description of a range should be considered to have specifically disclosed all the possible sub-ranges as well as individual numerical values within that range.

It is appreciated that certain features of the disclosed subject matter, which are, for clarity, described in the context of separate embodiments, may also be provided in combination in a single embodiment. Conversely, various features of the disclosed subject matter, which are, for brevity, described in the context of a single embodiment, may also be provided separately or in any suitable sub-combination or as suitable in any other described embodiment of the disclosed subject matter. Certain features described in the context of various embodiments are not to be considered essential features of those embodiments, unless the embodiment is inoperative without those elements.

One objective of the present disclosure is delivering RF energy (radiation) for charging at least one receiver situated at a distance from a transmitter while complying with safety regulations that restrict exposure of humans to RF field strength above the regulation's threshold value, which is lower than a strength sufficient for charging at least one receiver.

Another objective of the present disclosure is determining a position of humans or animals (dogs, cats, or any other living species), in proximity to an RF transmission pattern of a plurality of antennas in a venue. Additionally, or alternatively, determining a location of at least one receiver situated in the vicinity of the plurality of antennas.

Yet another objective of the present disclosure is shaping the RF transmitting pattern to focus its energy intensity (RF radiation) on the at least one receiver while nulling, or reducing to a minimum the energy intensity around an animal. Wherein, nulling its energy intensity comprising canceling the RF radiation around the animal, reducing the intensity within safety regulation, and any combination thereof, or the like. In some exemplary embodiments, shaping the RF transmitting pattern is preferably achieved by driving the plurality of antennas with different phases and amplitudes of power carriers.

Yet another objective of the present disclosure is minimizing the number of antennas having combined transmitting energy that sums to at least 1 Watt on an immediate vicinity of the at least one receiver.

Yet another objective of the present disclosure is providing at least one algorithm for adjusting the strength of an RF radiation field inside a radiation pattern caused by a plurality of RF-antennas through controlling the amplitude and phase that each antenna of the plurality of antennas, transmits.

Referring now to FIG. 1 showing a block diagram of a long-range wireless charging system, in accordance with some exemplary embodiments of the disclosed subject matter. The long-range wireless charging system 100 comprises a transmitter 101, a plurality of antennas 124 and at least one sensor 131/132.

In some exemplary embodiments, transmitter 101 comprises a controller 110; a frequency oscillator 102; phase comparator 103; a plurality of phase shifters 121; a plurality of programable gain amplifiers (PGA) 122; a communication interface (IF) 111; and a plurality of splitters 123.

Controller 110 can be a central processing unit (CPU), a microprocessor, an electronic circuit, an integrated circuit (IC), or the like. Additionally, or alternatively, controller 110 can be implemented as firmware written for or ported to a specific processor such as digital signal processor (DSP) or microcontrollers, or can be implemented as hardware or configurable hardware such as field programmable gate array (FPGA) or application specific integrated circuit (ASIC). Controller 110 can be utilized to perform computations required by transmitter 101 or any of its subcomponents for executing steps of a method, such as a method depicted in FIG. 3.

In some exemplary embodiments, controller 110 comprises a semiconductor memory component (not shown). The memory may be persistent or volatile memory, such as for example, a flash memory, a random-access memory (RAM), a programable read only memory (PROM), a re-programmable memory (FLASH), and any combination thereof, or the like.

In some exemplary embodiments, the memory retains program code to activate controller 110 to perform acts associated with determining the position of an animal near a space where RF-radiation is transmitted in the venue; determining a location of at least one receiver situated in the in the venue; shaping the RF transmitting pattern; and any combination thereof, or the like. In some exemplary embodiments, the controller 110 can also utilize its memory to retain connectivity software, monitoring information, configuration and control information and application associated with charging management of the present disclosure.

In some exemplary embodiments, controller 110 is configured for selectively controlling the transmitting frequency, gain, and phase shift for each antenna of the plurality of antennas 124a-124n by means of frequency oscillator 102, PGAs 122a-122n, and phase shifters 121a-121n respectively. In addition, the controller is configured to utilize phase comparator 103 for determining phase differences between signals received by the plurality of antennas.

In some exemplary embodiments, each antenna of the plurality of antennas is connected to transmitter 100 via one dedicated splitter out of the plurality of splitters 123a-123n. It should be noted that signals received by each antenna of the plurality of antennas are directed to the phase comparator 103 via its dedicated splitter. In some exemplary embodiments, splitter 123 can be either a passive or active component configured to pass a transmitting signal from a PGA to the antenna and also pass signals picked by the antenna to the phase comparator 103. It will be appreciated that antennas 124a-124n are bi-directional antennas.

In some exemplary embodiments, the IF 111 can be used as a communication channel between the at least one receiver and transmitter 101 where information, such as specific receiver power or field strength required by the receiver, transmitter capabilities and scheduling of the transmitter and a combination thereof, or the like. Additionally, or alternatively, the receiver may be configured to report the information upon connection setup, and or during operation. The information may also be used to calibrate the system and correct the radiation patterns. In some exemplary embodiments, the IF 111 can be implemented based on radio technology such as Bluetooth Low Energy, Bluetooth, Wi-Fi, infrared communication; and any combination thereof, or the like.

The components detailed above can be implemented as one or more sets of interrelated computer instructions, executed, for example, by controller 110 or by another processor. The components are arranged as one or more executable files, dynamic libraries, static libraries, methods, functions, services, or the like, programmed in any programming language and under any computing environment.

In some exemplary embodiments of the disclosed subject matter, system 100 comprises at least one sensor 131 configured to support the controller 110 in forming a three-dimensional (3D) map of a venue in which at least one receiver is situated. In some exemplary embodiments, the at least one sensor 131 can be comprised of a 3D camera; at least two two-dimensional cameras, at least two two-dimensional thermal cameras, at least one laser range finder, a plurality of proximity sensors; and any combination thereof, or the like. The at least one sensor 131 can be situated in one or more positions that allow them to obtain a full field of view that covers the entire venue.

In some exemplary embodiments, at least one sensor 131 is implemented as a plurality of cameras for capturing a plurality of images that can be processed by controller 110, for forming the 3D map. Additionally, the at least one sensor 131 can further comprise range finder technology, such as laser, for assisting in forming the 3D map.

In some exemplary embodiments of the disclosed subject matter, system 100 comprises a plurality of antennas 124a-124n situated in a venue either as an array or dispersed in the venue. Placing the antennas in the venue can be derived from the need to generate, with all the antennas together, an RF transmitting pattern that can cover any region of interest (ROI), i.e., an area in the venue where at least one receiver is situated. Each antenna of the plurality of antennas can be supported by a dedicated phase shifter and a dedicated PGA controlled by controller 110 for setting amplitude and relative phase of RF power to be transmitted by each antenna.

It should be noted that each antenna of the plurality of antennas 124a-124n can be a bidirectional antenna, supported by a splitter, and can be used to determine the location of the at least one receiver in the venue.

Figure 2:
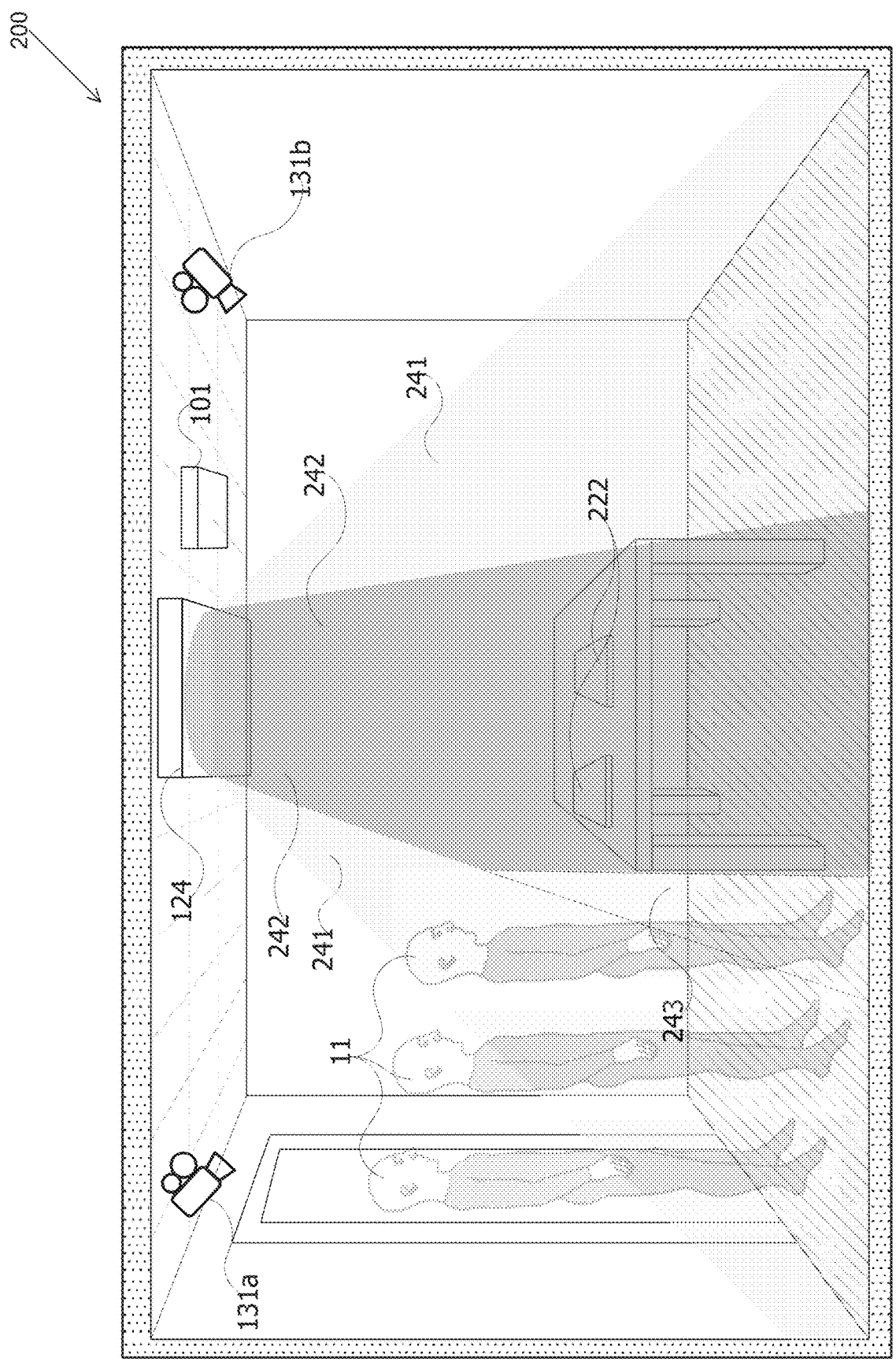
FIG. 2 illustrates a deployment of the long-range wireless charging system in a venue, in accordance with some exemplary embodiments of the disclosed subject matter.

Referring now to FIG. 2 illustrating a deployment of the long-range wireless charging system in a venue, in accordance with some exemplary embodiments of the disclosed subject matter. In a preferred embodiment, system 100 that is deployed in venue 200 comprises transmitter 101, an array of antennas 124 and two cameras 131a and 131b.

In some exemplary embodiments, camera 131a and camera 131b are situated in a position where each camera has a different field of view (FOY) so that the cameras can obtain images that cover an RF transmitting space (space) 241, in the venue. It should be noted that the term RF transmitting space 241 refers to a space in the venue that covers all the places in which receivers may be placed. In some exemplary embodiments, controller 110, of FIG. 1, is configured to use images obtained by cameras 131a and 131b for forming a 3D map of the space 241 in addition to employing an image-analysis-algorithm for determining locations of objects, such as receiver 222, and position of humans or animals 11, within the space 241.

It will be appreciated that the image-analysis-algorithm is based on sensors 131 coupled with controller 110 that are intended to detect humans, pets and other bodies that should not be exposed to emission above a regulatory level as well as determine a location of the at least one receiver 222. In some exemplary embodiments, the image-analysis-algorithm of controller 110, segments the 3D map of the space 241 into finite elements designated as "human", "receiver", and\or other. "Human" elements are designed to be protected from extensive emission, while "receiver" elements should be exposed to higher levels of emission.

In some exemplary embodiments, array 124 comprises a plurality of antennas, such as antennas 124a-124n of FIG. 1. The antennas are arranged in an array in a formation bound for generating RF transmitting pattern that covers space 241, which potentially can cover all possible ROIs, such as ROI 242, in which a receiver may be placed in the venue. However, it will be noted that the array should be situated in a position so its antennas are aligned for generating RF radiation pattern that covers space 241 of venue 200.

In alternative embodiments, the plurality of antennas may be dispersed in the venue yet they should all be aligned for generating RF radiation pattern that cover space 241. In yet other alternative embodiments, part of the plurality of antennas may be dispersed in the venue while the rest of the antennas form an array, such as array 124, wherein all the antennas should be aligned for generating RF transmitting pattern that cover space 241.

In some exemplary embodiments, the controller 110 is configured to shape the RF transmitting pattern to align with ROI 242 by setting amplitude and relative phase of RF power transmitted of each antenna of the plurality of antennas.

It will be reminded that dimensions of the ROI 242, the position humans 11, and the location of receiver 222 can be determined by controller 110 based on the 3D map. It should also be noted that not all the antennas of the plurality of antennas are activated for shaping the pattern to align with ROI 242.

It will be appreciated that the capability of setting the different amplitude and relative phase for each antenna is a tool for shaping the RF transmitting pattern intended to concentrate maximum RF radiation in the ROI 242 (peak) while reducing the RF radiation where human 11 is present (null), such as in null 243. It should be noted that the term "null" as used in the present disclosure refers to eliminating the RF radiation or attenuating the RF radiation to a minimum or reducing the RF radiation below safety regulation limit.

In some exemplary embodiments of the disclosed subject matter, the antennas in array 124 may be used for receiving RF signals emitted by one or more receivers 222 for the purpose of determining the location of the one or more receivers 222 or other elements. For example, receiver 222 transmits a signal having a 5 Ghz carrier frequency that can be received by the plurality of antennas 124a-124n. Consequently, controller 110 utilizes phase comparator 103 for measuring wave phase difference between signals received by the plurality of antennas to an accuracy that depends on the antenna's layout, e.g. of 5 degrees. The phase difference $\{D\}$ between two antennas $\{n,m\}$ may be defined as $D_{phase}$ (n, m) corresponding to a difference on physical location of the receiver compared to antenna is given by:

$$D_n - D_m = \frac{D_{phase}(n, m)}{\frac{360 * C}{5 * 10^9}} = D_{phase}(n, m) * 0.1666 \text{ [millimeters]}$$

where $\{C\}$ is the speed of light=$3*10^8$. Thus, by using multiple such distances wherein the exact place of the antennas is given, the location of the receiver can be derived. In case where the distances are longer than the wave length of the carrier, timing or reception of a burst may be used to derive the distances in granularity of wave length, and phase differences to achieve sub wave length granularity.

In some exemplary embodiments, the location of the at least one receiver 222 may be determined by a visual queue or marking, such as a 2D or 3D barcode, on the receiver that can be detected by any one of the cameras. The detected bar code may incorporate information that enables identification of the receiver and facilitates calculating the distance and angle to the receiver by measurement of the captured image size and shape vs. known size and shape of the bar code. In addition, the bar code can provide additional information on the receiver, such as its expected power consumption or required field strength.

It should be noted that coordinates resulting from determining the positions of humans, using cameras 131, and coordinates resulting from determining the locations of receivers 222, using RF signal, have to overlap. In some exemplary embodiments, offsets between the two coordinates can be tuned out by a calibration procedure using both imaging subsystem (cameras 131) and radio subsystem (RF signal) to establish locations of test objects placed in different locations in venue 200 and tuning out any persistent shifts between the two coordinates.

It will be appreciated that the total number of antennas required for the long-range wireless charging system of the present disclosure is significantly lower, due to focusing on ROIs in which humans are not present.

In some exemplary embodiments of the disclosed subject matter, a 3D emission pattern of each antenna can be determined, for example, by preconfiguring the emission pattern into controller 110 based on measurements performed during setup, production, calibration, and any combination thereof, or the like. The emission level of each antenna can be given by (x,y,z,l), where $\{x,y,z\}$ are the antenna coordinates and $\{l\}$ specifies an antenna number in a plurality of antennas, such as array 124.

In some exemplary embodiments, the 3D space can be segmented into volumes having a fixed size and emission level for each such defined volume element. The fixed size can be derived from the antenna size and/or transmitting wavelength. Consequently, the size will determine the resolution and granularity for calculating the 3D of the relevant space. It should be noted that the emission values can be defined based on the measurement of each antenna pattern or based on simulation of the antenna response.

Figure 3:
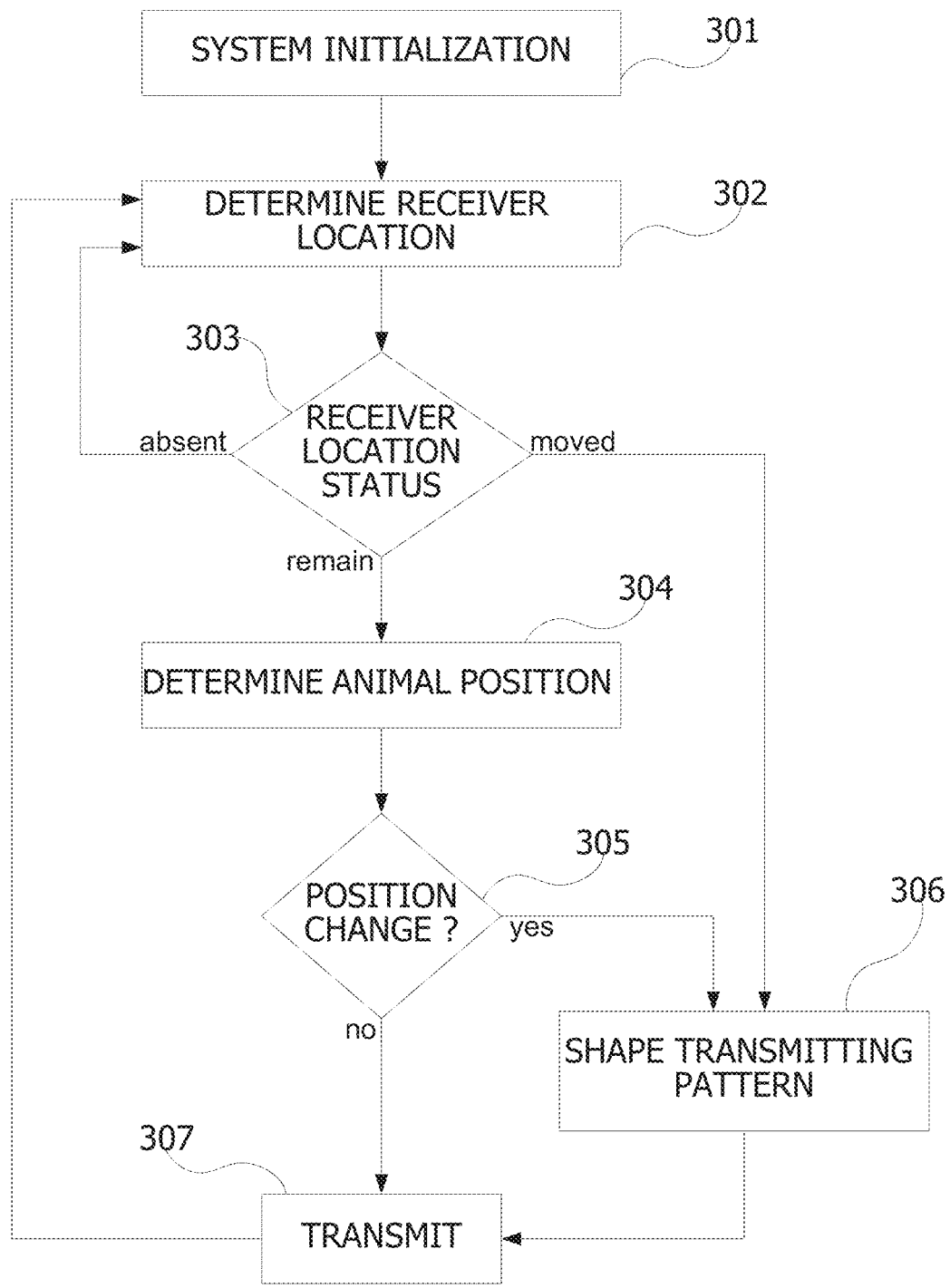
FIG. 3 shows a flowchart diagram of a method implemented by the long-range wireless charging system, in accordance with some exemplary embodiments of the disclosed subject matter.

Referring now to FIG. 3 showing a flowchart diagram of an operating method implemented by the long-range wireless charging system, in accordance with some exemplary embodiments of the disclosed subject matter.

In step 301, the long-range wireless charging system is initialized. In some exemplary embodiments, a system initialization is conducted following the deployment of system 100 in a venue, such as venue 200 of FIG. 2.

The initialization can be comprised of: utilizing controller 110 and sensors 131 of FIG. 1 (imaging subsystem) for determining the 3D map of venue 200; utilizing controller 110 and the plurality of antennas (radio subsystem) for determining space 241; conducting calibration procedure using both imaging subsystem and radio subsystem to establish locations of test objects placed in different locations in venue 200 for aligning the space 241 coordinates with the 3D map coordinates. Additionally, or alternatively, an emission pattern of each antenna of the plurality of antennas can be preset into controller 110 based on measurements performed during setup, production, calibration, and any combination thereof, or the like. It should be noted that the measurements are preset to the controller as normalizing factor for each antenna of the plurality of the antennas.

In step 302, a location of at least one receiver is determined. In some exemplary embodiments, the radio subsystem can be utilized for determining if at least one receiver 222 is present in the venue as well as the coordinates of its location. It should be noted that the receiver location is determined based on analyzing, by the controller, phase and timing differences between signals received by different bidirectional antennas from at least one receiver. Additionally, or alternatively, the location of at least one receiver can also be determined by using the imaging subsystem coupled with an image-analysis-algorithm, as described above.

In step 303, a status of the at least one receiver is indicated. In some exemplary embodiments, the status of one or more receivers 222 following the determination of step 302 can provide one out of three possible indications: absent or remain or moved.

An absent indication points out that no receiver is present in the venue; a remain indication (no-changes) points out that the one or more receivers stayed put since previous location determination; and a moved indication points out that at least one receiver was either removed or changed location since the previous location determination.

In some exemplary embodiments, the controller 110 repeats step 302 following an absent indication.

In step 304, a position of at least one animal is determined. In some exemplary embodiments, following the remain indication, the imaging subsystem coupled with an image-analysis-algorithm can be utilized for determining if at least one animal, such as human 11, of FIG. 2, is present in the venue as well as the coordinates of the animal position.

In step 305, a status of the at least one animal is determined. In some exemplary embodiments, the status of one or more humans or animals following the determination of step 304 indicates if the animal presence or position has been changed since previous position determination.

In step 306, a transmitting pattern is shaped. In some exemplary embodiments, following the remain indication and a change of animal position, or a moved indication, the shaping of the transmitting pattern is performed. The shaping involves calculating, for each antenna, specific amplitudes having relative specific phases for forming RF radiation transmitting pattern that peak the RF radiation on the location of the at least one receiver 222 and null the RF radiation around the position of the at least one human 11. In another word, steering the peak of RF radiation (involving the plurality of antennas combined) to the ROI 242 while nulling the RF radiation where human 11 is present, e.g. null 243, as depicted in FIG. 2.

In some exemplary embodiments, the shaping of the RF radiation transmitting pattern comprising characterizing amplitudes and phase of RF radiation to be emitted by each antenna of the plurality of antennas so as to steer the peak of the RF-radiation to the location of the at least one receiver and null the RF-radiation around the position of the at least one animal.

In some exemplary embodiments, the shaping of the transmitting pattern, i.e. characterizing amplitudes and phase of RF radiation, can be based on calculating, by the controller 110, a mean squared error according to the following error term:

$$\text{Error} = \Sigma_l(\Sigma_{n,m}(G(l)*E(x(n,m),y(n,m),z(n,m),l))^2 + (G(l)*E(x0,y0,z0,l) - P)^2).$$

The receiver's location is represented by x0, y0, z0 and an animal's (human) position is represented by x(n,m), y(n,m), z(n, m) where {n} is an index of one human out of a potentially plurality of humans. {m} is a running number across different volume elements of the human position, since a human size is larger than the volume of a single receiving element. Where {G(l)} are the specific gain values of each antenna element, note that {G} may have complex value for allowing phase difference, and {P} marks the target field strength in the receiver location.

It should be noted that the solution to derive the {G} values is by performing minimization on the above error term at the positions of the humans, which will provide a set of linear equations that can be solved to deriving the {G} values.

Once the {G} values are derived, the expected field strength can be calculated for all position points associated with humans and verify that they all comply with regulation. It should be noted that when at least one human is in close proximity to the receiver, the controller 110 shall either lower the transmitting power or completely shut down the transmitting power.

In some exemplary embodiments, the shaping of the transmitting pattern (hereinafter shaping) can be based on calculating, by the controller 110, a mean squared error according to the following error term.

$$\text{Error} = \Sigma(\Sigma(G(l)*E(x(n,m),y(n,m),z(n,m),l))2n,m + (G(l)*E(x0,y0,z0,l) - P)2)l$$

In another embodiment, the amount of power required by the transmitter 100 to achieve the shaped pattern as expressed by the {G(l)} values, is also taken into consideration so the above error term can be modified to:

$$\text{Error} = \Sigma_l(\Sigma_{n,m}(G(l)*E(x(n,m),y(n,m),z(n,m),l))^2 + (G(l)*E(x0,y0,z0,l) - P)^2 + k*|G(l)|^2).$$

Where {k} is a weight function for the consumed power to be arbitrarily selected. It should be noted that other error terms that use absolute value of amplitude at a location may be used. However, these error terms may not yield a set of linear equations that are analytically solvable, yet other numeric techniques may be used to derive the set of {G(l)}.

In some exemplary embodiments, the shaping can be based on solving a set of linear equations, such as the following:

$$\sum_l G(l) * E(x0, y0, z0, l) = P$$

$$\sum_l G(l) * E(x(n), y(n), z(n), l) = 0$$

where $n = 1 \ldots (l-1)$

The points {n} represent the center of position of the detected humans. In case that number is lower than {l−1}, additional points covered by the humans are added until reaching (l−1). This approach would only be relevant if the number of detected humans is ≤{l−1}.

In some exemplary embodiments, the radiation pattern of each antenna can be frequency dependent. The dependency can be related to the overall gain of the antenna and/or the radiation pattern, where strong amplitude lobes direction is shifted. The controller 110 can be configured for selecting a specific frequency of operation, using the frequency oscillator 102 of FIG. 1, based on the mean squared error calculation, described above, that can be performed for each of the possible operational frequencies, and selection of the frequency providing best result. It should be noted that the best result for the frequency dependent embodiment may be based on meeting the regulatory limits for each of the human position points, minimization of overall error terms, lowest gain values (which represent minimal power transmitting achieving the target power at the receiver location), maximizing field strength at the receiver locations and any combination thereof, or the like.

Additionally, or alternatively, the frequency dependent embodiment can be expanded to handle multiple receivers by adding additional terms to the error optimization equations for each of the receivers. The target field strength {P} for each of the receivers may be different, to match the specific receiver requirements.

In some exemplary embodiments, the controller 110 can be configured for handling power transfer to multiple receivers by time sharing. i.e. transmitting energy to one receiver for a specific time duration, followed by transmitting energy to another receiver and so on. In this embodiment, only one term is needed for a receiver in the minimization equation at each time period. Additionally, or alternatively, controller 110 can switch between these approaches and provide charging only for part of the receivers at a given time period. It should be noted that reducing the number of served receivers at a time may be based on the system ability to maintain regulatory limits for field strength in human occupied areas or other system considerations.

In step 307, RF energy is transmitted to at least one receiver. In some exemplary embodiments, upon shaping the transmitting pattern and/or following no change in the location of the receiver and position of the humans or animals, the transmitter 100 activates RF energy transmitting in accordance with the shaped transmitting pattern.

It will be appreciated that upon activating the RF energy transmitting, the controller 110 will continually repeat steps 302 to 306 mutatis mutandis from changes of receiver location and animal position. In some exemplary embodiments, controller 110 shall cease the transmitting following an absent indication in step 303.

In some exemplary embodiments of the disclosed subject matter, the controller may be configured to perform calculations and operations designated for mitigating effects of RF waves reflection from objects, such as walls and other objects in the venue on the transmitting patterns.

One method of mitigating reflection effects can be achieved by utilizing the imaging subsystem to evaluate location of walls in the venue and reference values for wave reflection index used to construct corrected E(x,y,z,l) function that accounts for the approximated reflections. The corrected E(x,y,z,l) function can be incorporated in the shaping RF-radiation patterns for mitigating reflection effects.

In some exemplary embodiments, the corrected function can be derived by using ray tracing approach to evaluate the contribution of the reflections. The reflection indexes can be provided for different materials, which can be determined based on the image-analysis-algorithm of the imaging subsystem. In some exemplary embodiments, the above described method for mitigating reflection effects may be incorporated to step 301 as part of the calibration procedure.

another method of mitigating reflection effects can be achieved by utilizing the at least one receiver for evaluating the reflection index during operation. In some exemplary embodiments, the controller 110 can shape the transmitting pattern to concentrate on a specific wall while keeping the transmitting pattern to the receiver minimal. In such case, the calculation would be based on the original E(x,y,z,l) transmitting pattern. The receiver would then report to the controller the aquitard level of power. Based on the measurement and distances of receiver from the wall and the transmitter, the reflection index of the wall can be estimated.

The present disclosed subject matter may be a system, a method, and/or a computer program product. The computer program product may include a computer readable storage medium (or media) having computer readable program instructions thereon for causing a processor to carry out aspects of the present disclosed subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosed subject matter may be assembler instructions, instruction-set-architecture (ISA)

instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosed subject matter.

Aspects of the present disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description, but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

The invention claimed is:

1. A long-distance wireless charging system for charging at least one receiver in a venue that is used by humans or animals, the long-distance wireless charging system comprising:
   a plurality of antennas aligned for transmitting RF radiation to a space within the venue;
   at least one sensor for determining a position of at least one human or animal and a location of the at least one receiver in the space; and
   a transmitter, having a controller, configured to shape the RF radiation to peak the RF radiation on the location of the at least one receiver and null the RF radiation around the position of the at least one human or animal by controlling amplitudes and phases of the RF radiation transmitted from each antenna of the plurality of antennas.

2. The long-distance wireless charging system of claim 1, wherein the plurality of antennas are bidirectional antennas, and
   wherein the location of the at least one receiver is determined based on signals initiated by the at least one receiver and received by at least one antenna of the plurality of antennas.

3. The long-distance wireless charging system of claim 1, wherein the controller obtains images from the at least one sensor for forming a three-dimensional map of the venue, and
wherein the controller comprises an image-analysis-algorithm configured for determining the position of the at least one human or animal and the location of the at least one receiver in the space.

4. The long-distance wireless charging system of claim 1, wherein the transmitter further comprises
a frequency oscillator;
a plurality of phase shifters; and
a plurality of programmable gain amplifiers used, by the controller, to shape the RF radiation to each antenna by selectively controlling frequencies, amplitudes, and phases of RF radiation transmitting of each antenna of the plurality of antennas.

5. The long-distance wireless charging system of claim 1, wherein the transmitter further comprises a plurality of splitters and a phase comparator,
wherein the signals received by a bidirectional antenna of the plurality of antennas are directed via a splitter of the plurality of splitter to the phase comparator, and
wherein the phase comparator is used by the controller for determining the location of the at least one receiver.

6. The long-distance wireless charging system of claim 1, which further comprises test objects placed in the venue during a system calibration procedure.

7. An operating method of a long-range wireless charging system for charging at least one receiver in a venue that is used by humans or animals, the method comprising:
initializing the system, wherein the system comprises a transmitter, having a controller, used to control a plurality of antennas for transmitting RF radiation, by each antenna, to a space within the venue; and
at least one sensor connected to the transmitter;
determining location and status of the at least one receiver based on signals initiated by the at least one receiver and received by the at least one antenna of the plurality of antennas;
determining presence and position of at least one human or animal in the space by the at least one sensor;
shaping, by the controller, the RF radiation for forming at least one RF radiation transmitting pattern to peak on the location of the at least one receiver and null around the position of the at least one human or animal by characterizing amplitudes and phases of the RF radiation to be emitted by each antenna of the plurality of antennas; and
transmitting the RF radiation transmitting pattern by the plurality of antennas.

8. The operating method of claim 7, wherein said initializing the system comprises:
determining a 3D map and coordinates of the venue; and
determining coordinates of the space that the plurality of antennas cover.

9. The operating method of claim 8, wherein said initializing further comprises:
conducting a calibration procedure comprising aligning the coordinates of the venue with the coordinates of the space;
performing emission measurements for each antenna of the plurality of antennas; and
presetting the measurements to the controller as normalizing factor for each antenna of the plurality of the antennas.

10. The operating method of claim 8, wherein said initializing the system further comprises using the 3D map and coordinates for determining location of objects and their RF reflection index in the venue to be used in the shaping for mitigating reflection effects.

11. The operating method of claim 7, wherein said determining location and status further comprises analyzing, by the controller, phase and timing differences between signals received by the at least one antenna.

12. The operating method of claim 7, wherein the status comprises indications selected from the group consisting of absent; remain; and moved, and
wherein transmitting the RF radiation pattern is ceased by the controller following absent indication.

13. The operating method of claim 7, wherein said determining presence and position of at least one human or animal or determining location and status of the at least one receiver comprises using the controller for obtaining images from the at least one sensor and utilizing an image-analysis-algorithm.

14. The operating method of claim 7, wherein the shaping is based on calculating an error term.

15. The operating method of claim 7, wherein the shaping further comprises calculating one or more frequencies of RF radiation to be emitted by each antenna of the plurality of antennas.

16. The operating method of claim 7, wherein RF radiation transmitting patterns have different characterizations.

17. The operating method of claim 7, wherein the transmitter uses time sharing sequence for separately transmitting RF radiation transmitting pattern to each receiver of the at least one receiver.

18. The long-distance wireless charging system of claim 1, wherein the position of the at least one human or animal comprises a first set of coordinates and the location comprises a second set of coordinates.

19. The long-distance wireless charging system of claim 18, wherein one or more offsets between the first and second sets of coordinates are tuned out by a calibration procedure to establish locations of one or more test objects.

20. The long-distance wireless charging system of claim 1, wherein the position of the at least one human or animal comprises a coordinate set of x(n, m), y(n, m), z(n, m), where {n} is an index of one human or animal out of the at least one human or animal and {m} is a running number.

* * * * *